United States Patent
Mirza et al.

(10) Patent No.: US 7,911,974 B1
(45) Date of Patent: Mar. 22, 2011

(54) SERVICE LAYER AVAILABILITY

(75) Inventors: Nasir Mahmood Mirza, Overland Park, KS (US); Sameer Akbar Khan, Overland Park, KS (US); Usman Muhammad Naim, Overland Park, KS (US); Brajendra Singh Thakur, Overland Park, KS (US); Andrew L. Davey, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 949 days.

(21) Appl. No.: 11/627,240

(22) Filed: Jan. 25, 2007

(51) Int. Cl.
*H04L 12/26* (2006.01)

(52) U.S. Cl. ........................................ 370/254; 709/224

(58) Field of Classification Search .................. 370/469, 370/254; 709/224; 705/781, 734, 767, 789
See application file for complete search history.

(56) References Cited

U.S. PATENT DOCUMENTS

| 6,453,268 | B1 | 9/2002 | Carney et al. |
| 6,502,131 | B1 | 12/2002 | Vaid et al. |
| 6,584,504 | B1 | 6/2003 | Choe |
| 6,831,666 | B1* | 12/2004 | Kreis ............................ 715/781 |
| 7,330,889 | B2* | 2/2008 | Foody et al. .................. 709/224 |
| 2002/0165822 | A1* | 11/2002 | Makipaa ......................... 705/40 |
| 2003/0225876 | A1* | 12/2003 | Oliver et al. .................. 709/224 |
| 2005/0216585 | A1 | 9/2005 | Todorova et al. |
| 2007/0239873 | A1 | 10/2007 | Farhat et al. |
| 2008/0021918 | A1* | 1/2008 | Rao .............................. 707/102 |
| 2008/0049775 | A1* | 2/2008 | Morrill et al. ................. 370/419 |
| 2008/0090513 | A1 | 4/2008 | Collins et al. |

FOREIGN PATENT DOCUMENTS

WO 2005101947 11/2005

* cited by examiner

*Primary Examiner* — Melvin Marcelo

(57) ABSTRACT

A method of operating a service availability system to monitor the availability of a communication service having a plurality of service layers provided by a plurality of service elements comprises receiving performance data from each of the service elements indicating the performance of each of the service elements, processing the performance data to determine availability levels of each of the service layers, and displaying on a graphical user interface the availability levels of each of the service layers.

12 Claims, 7 Drawing Sheets

SERVICE LAYER AVAILABILITY

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to telecommunications, and in particular, to service layer availability for communication services.

2. Description of the Prior Art

Modern communication providers often times offer a wide variety of communications services to customers. For example, customers frequently purchase, subscribe to, or otherwise obtain voice calling, ring tone, text messaging, or Internet access services from communication providers.

Typically, provisioning and providing communication services involves a multitude of service layers. For instance, many communication services require a customer access layer for providing a user via a device with access. A network access layer is frequently required for bridging the customer access layer to a service layer. The service layer commonly provides the communication service itself. In support of the communication service, a service bureau layer or business applications layers could be included.

Many different physical systems or elements are used to provide the above mentioned service layers. In the design of communication services, the various service layers can be defined and categorized as desired. For example, customer access layer elements could include cable modems, wireless base stations, and communication devices. Examples of network access layer elements could include media gateways, session border controllers, and next generation gateways. Examples of service layer elements could include email servers, text messaging servers, and ring tone servers. Examples of service bureau layer elements could include credit check systems. Examples of business application layer elements could include billing systems and call record systems. It should be understood that single element could be defined as included in one or more service layers.

In the prior art, performance monitoring systems are well know. As part of most performance monitoring systems, the physical elements involved in a particular service monitor their own performance and transmit performance information to a central repository or system for analysis by professionals. For instance, many network elements transmit status and performance information to network operations centers. Such performance information usually indicates bandwidth utilization, processor capacity, and the like.

At the central repository or network operation center, the performance information is usually displayed via a graphical user interface in a manner so as to inform a user of the status of a particular network element. The performance information is frequently processed to generate an availability metric that is then displayed to the user.

In a metro-area example, a graphical user interface could display all of the elements involved with a particular service, such as wireless voice calls. The actual elements, such as the base stations, mobile switching center, and base station controllers, required to provide the service generate and transmit performance information to the central repository. The performance information is then processed on a per-element basis to determine an availability metric for each element. In an example, an element is described as 99.999% available (five-nine availability). A user could then click on or otherwise read the availability of the various network elements to determine their availability.

Unfortunately, performance monitoring systems in the prior art only account for and display performance information on a per-network element basis. As a result, a great amount of time and effort is required by technicians and other such professionals to determine the availability of an entire service layer, rather than the individual elements of the service layer. It would be preferred if such professionals could be freed from having to infer or predict the availability of a service layer and thereby avoid costly and time consuming errors.

SUMMARY OF THE INVENTION

In an embodiment of the invention, a method of operating a service availability system to monitor the availability of a communication service having a plurality of service layers provided by a plurality of service elements comprises receiving performance data from each of the service elements indicating the performance of each of the service elements, processing the performance data to determine availability levels of each of the service layers, and displaying on a graphical user interface the availability levels of each of the service layers.

In an embodiment of the invention, a first service layer of the plurality of service layers comprises a customer access layer.

In an embodiment of the invention, a second service layer of the plurality of service layers comprises a network access layer.

In an embodiment of the invention, a third service layer of the plurality of service layers comprises a service access layer.

In an embodiment of the invention, a fourth service layer of the plurality of service layers comprises a business applications layer.

In an embodiment of the invention, a fifth service layer of the plurality of service layers comprises a service bureau layer.

In an embodiment of the invention, a software product for operating a service availability system to monitor the availability of a communication service having a plurality of service layers provided by a plurality of service elements comprises a storage medium having stored thereon instructions that, when executed by a processing system, direct the processing system to receive performance data from each of the service elements indicating the performance of each of the service elements, process the performance data to determine availability levels of each of the service layers, and display on a graphical user interface the availability levels of each of the service layers.

BRIEF DESCRIPTION OF THE DRAWINGS

The same reference number represents the same element on all drawings.

DETAILED DESCRIPTION OF THE PREFERRED EMBODIMENT

FIGS. 1-7 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
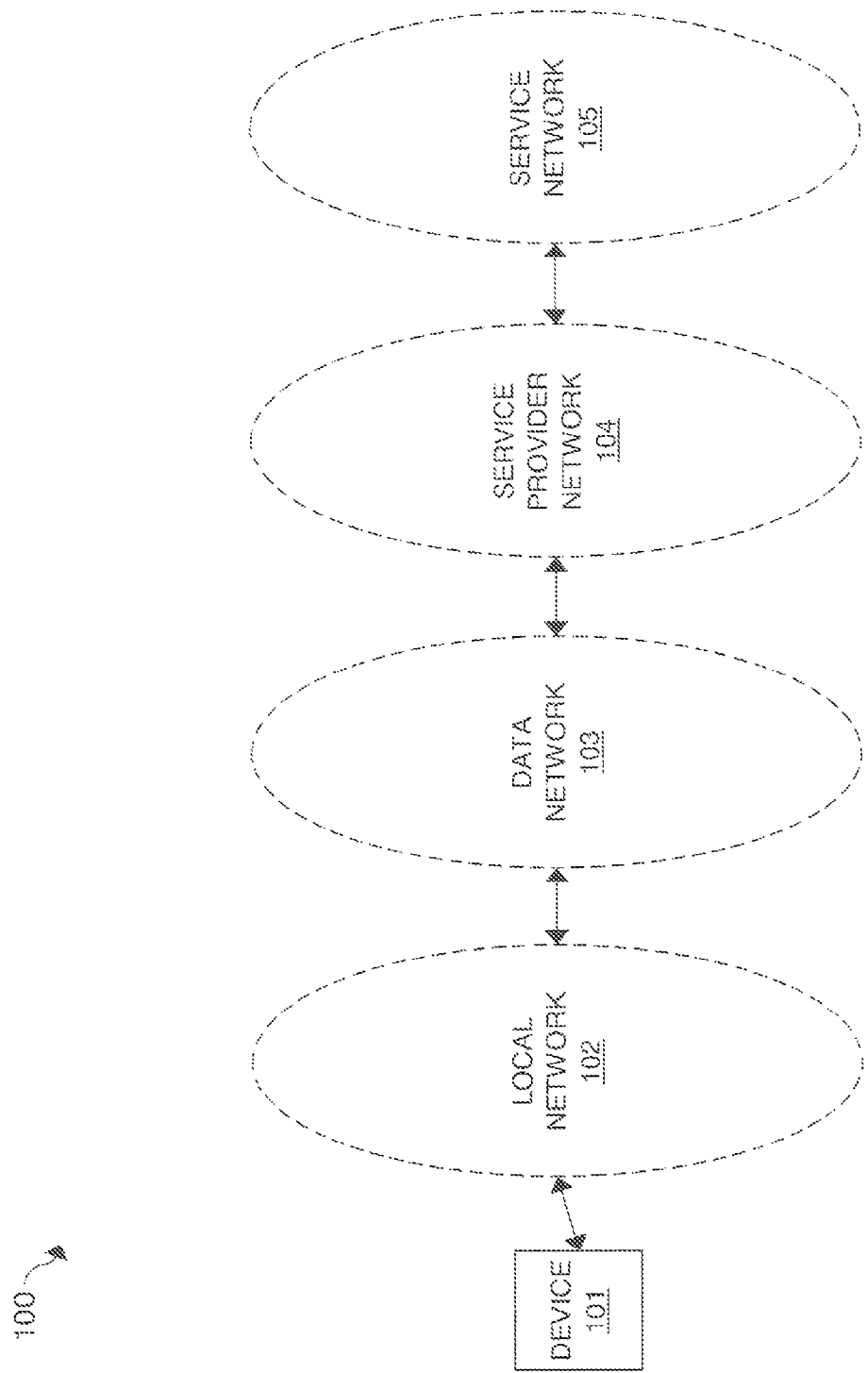
FIG. 1 illustrates a communication network in an embodiment of the invention.

FIG. 1 illustrates communication network 100 in an embodiment of the invention for providing a communication service. Communication network 100 includes device 101, local network 102, data network 103, service provider network 104, and service network 105.

In operation, a customer uses device 101 to access the communication service. In order access the communication service, device 101 is in communication with or otherwise operatively coupled to local network 102. In turn, local network 102 is operatively coupled to data network 103. Data network 103 is operatively coupled to service provider network 104, and service provider network 104 is operatively coupled to service network 105. The communication service is provided over the link between service network 105 and device 101.

Typically, many different networks and network elements are required to provide the communication service between service network 105 and device 102. While in operation, many network elements transmit performance data indicating the current performance of the network elements. Such performance data could include, for example, processor utilization levels, bandwidth, loss, disk utilization, and congestion data, as well as other types of performance data. The network elements often times transmit the performance data to centralized databases for analysis. In many cases, network personnel examine the data to determine how well each element or group of elements is performing.

It should be understood that any service, when provided by several diverse networks and many different network elements, could be comprised of several or even many different service layers. Service layers can be defined for any given service. In some examples, standardized service layer models are applied to a service.

Figure 2:
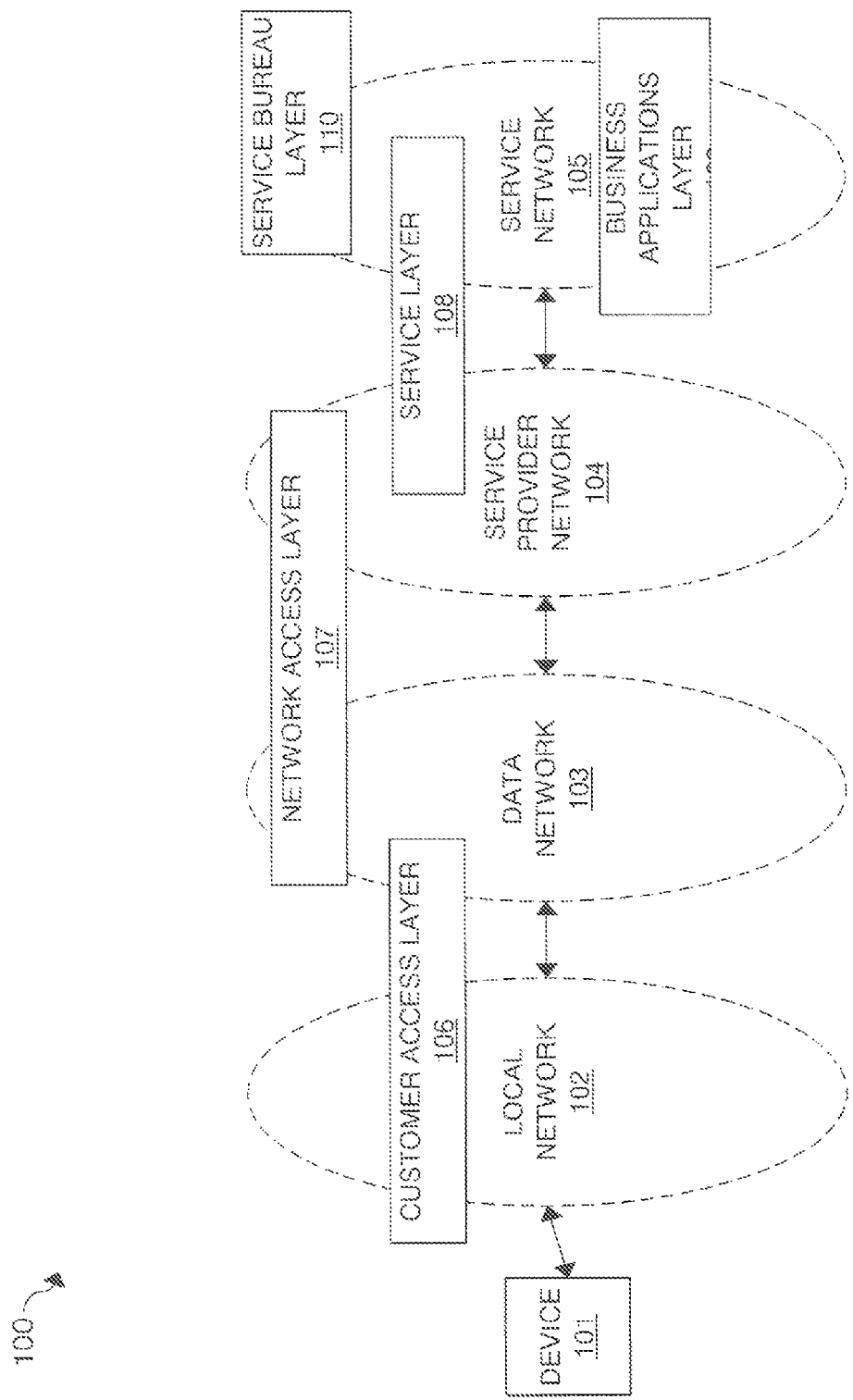
FIG. 2 illustrates a communication network in an embodiment of the invention.

FIG. 2 provides one service layer model for a service provided over communication network 100. In FIG. 2, a service has five service layers consisting of customer access layer 106, network access layer 107, service layer 108, business applications layer 109, and service bureau layer 110. Customer access layer 106 is overlayed on local network 102 and data network 103. Network access layer 107 is overlayed on data network 103 and service provider network 104. Service layer 108 is overlayed on service provider network 104 and service network 105. Service bureau layer 110 is overlayed on service network 105. Likewise, business applications layer 109 is overlayed on service network 105.

Figure 3:
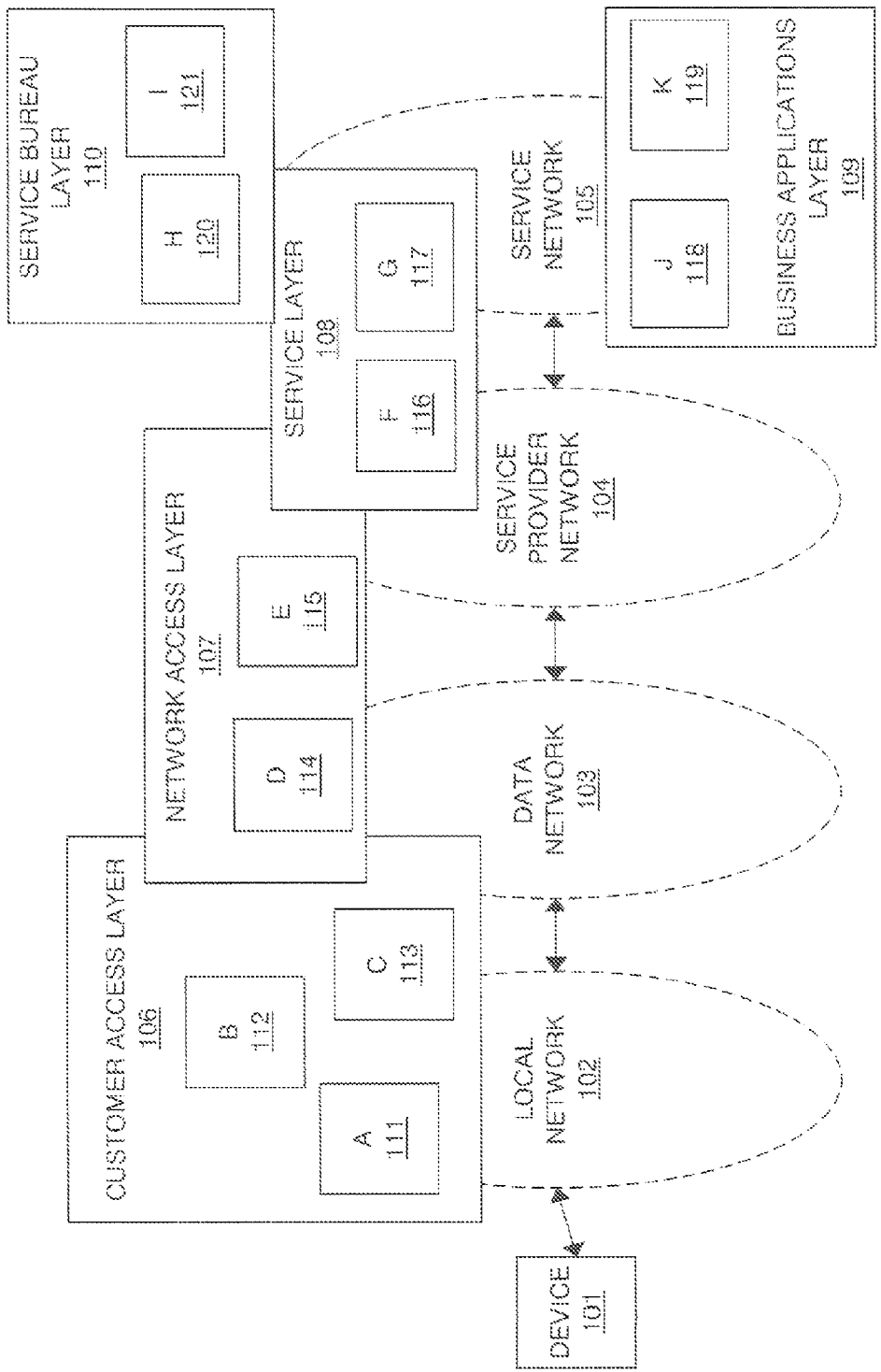
FIG. 3 illustrates a communication network in an embodiment of the invention.
Figure 4:
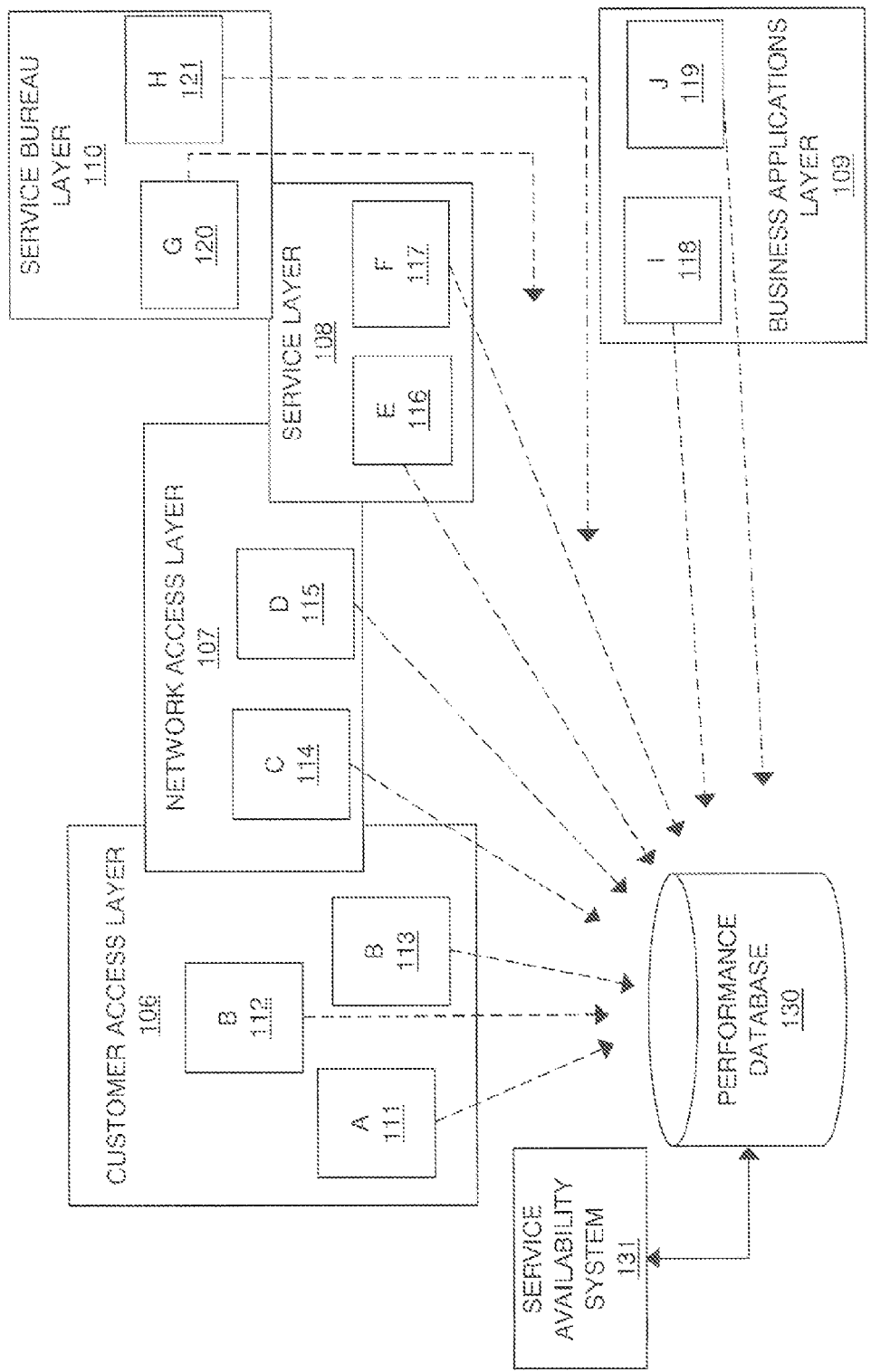
FIG. 4 illustrates a communication network in an embodiment of the invention.

As a part of the service layer model illustrated in FIG. 2, any particular service layer could be defined as including any variety of network elements, such as servers, switches, gateways, base transceiver systems, backhaul elements, or the like. FIG. 3 illustrates how the service layers illustrated in FIG. 2 could be each defined as encompassing multiple network elements. Customer access layer 106 includes element A 111, element B 112, and element C 111. Network access layer 107 includes element D 114 and element E 115. Service layer 108 includes element F 116 and element G 117. Service bureau layer 110 includes element H 120 and element I 121. Business applications layer 109 includes element J 118 and element K 119.

In operation, the elements of the various service layers of communication network 100 generate and transmit performance data to performance database 130. A service availability system (SAS) 131 could be operatively coupled to or otherwise in communication with performance database 130.

Figure 5:
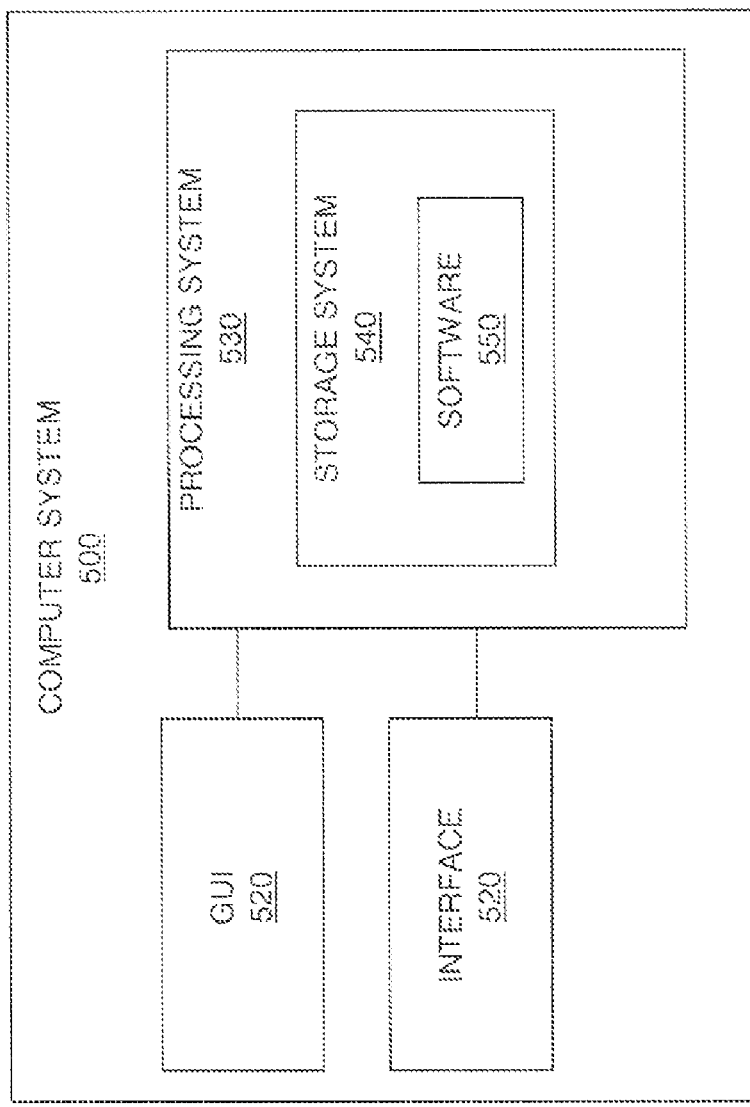
FIG. 5 illustrates a service availability system in an embodiment of the invention.

FIG. 5 illustrates a service availability system 500 in an embodiment of the invention. Service availability system 500 includes graphical user interface (GUI) 510, data interface 520, processing system 530, storage system 540, and software 550. Storage system 540 stores software 550. Processing system 530 is linked to data interface 520. Service availability system 500 could be comprised of a programmed general-purpose computer, although those skilled in the art will appreciate that programmable or special purpose circuitry and equipment may be used. Service availability system 500 may use a client server architecture where operations are distributed among a server system and client devices that together comprise elements 510-550.

Data interface 520 could comprise a network interface card, modem, port, or some other communication device. Data interface 520 may be distributed among multiple communication devices. Processing system 530 could comprise a computer microprocessor, logic circuit, or some other processing device.

Processing system 530 may be distributed among multiple processing devices. Storage system 540 could comprise a disk, tape, integrated circuit, server, or some other memory device. Storage system 540 may be distributed among multiple memory devices. GUI 510 could comprise a monitor, a screen, or other type of display capable displaying information in a graphical format to a user.

Processing system 530 retrieves and executes software 550 from storage system 540. Software 550 may comprise an operating system, utilities, drivers, networking software, and other software typically loaded onto a general-purpose computer. Software 550 could also comprise an application program, firmware, or some other form of machine-readable processing instructions. When executed by the processing system 530, software 550 directs processing system 530 to operate as described for service availability system 131.

In operation, SAS 131 could access the performance data stored in performance database 130. SAS 131 could retrieve the various individual performance data and process the performance data to determine availability levels of the various service layers. For instance, SAS 131 could retrieve performance data from some or all of the network elements illustrated in FIG. 4. SAS 131 could then process the individual performance data for each element in a particular service layer to determine the overall availability of the service layer. SAS 131 could then display the availability of a service layer on a graphical user interface.

Figure 6:
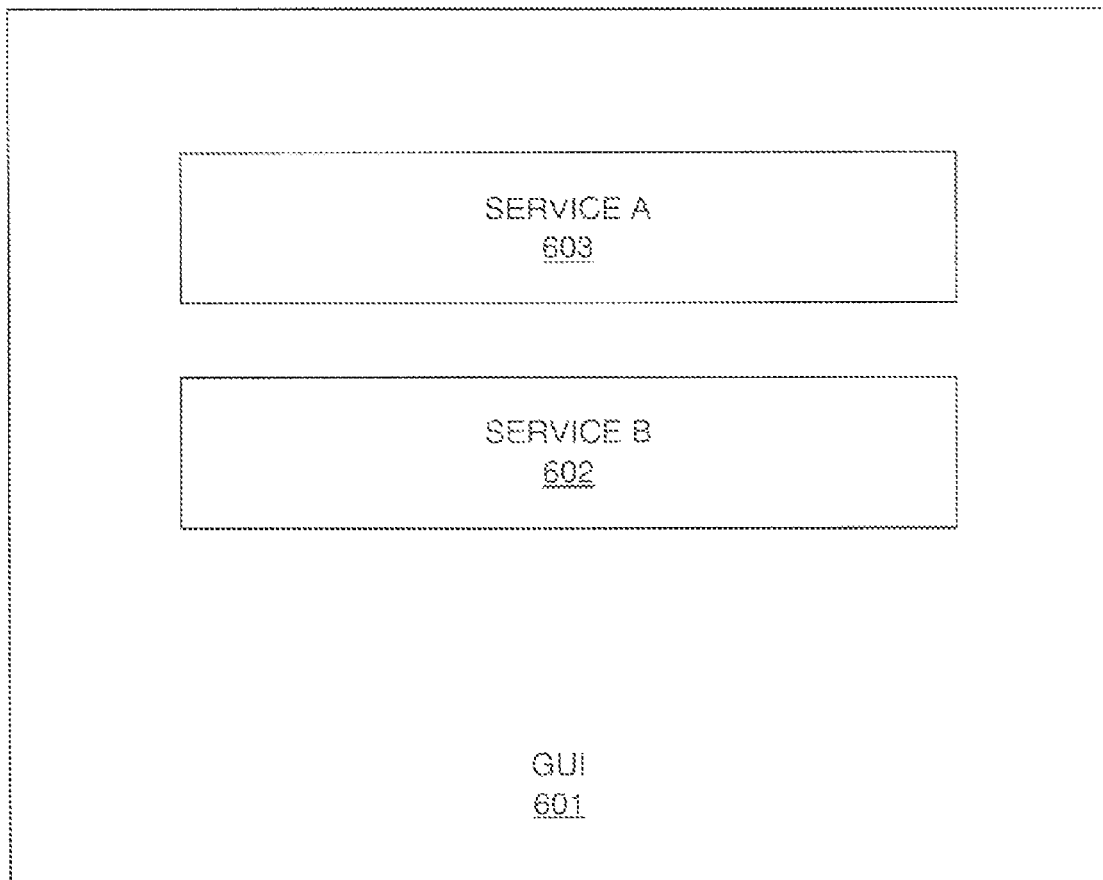
FIG. 6 illustrates a graphical user interface in an embodiment of the invention.

FIG. 6 illustrates a particular graphical user interface (GUI) 601 in an embodiment of the invention. GUI 601 could display multiple graphical representations of services, such as service A 603 and service B 602. Services A 603 and B 602 could be any communication service provided by communication network 100. A user could select one of either service to determine the availability of the service. SAS 131 could then process performance data from performance database 130 to determine the availability of each service layer of the selected service.

Figure 7:
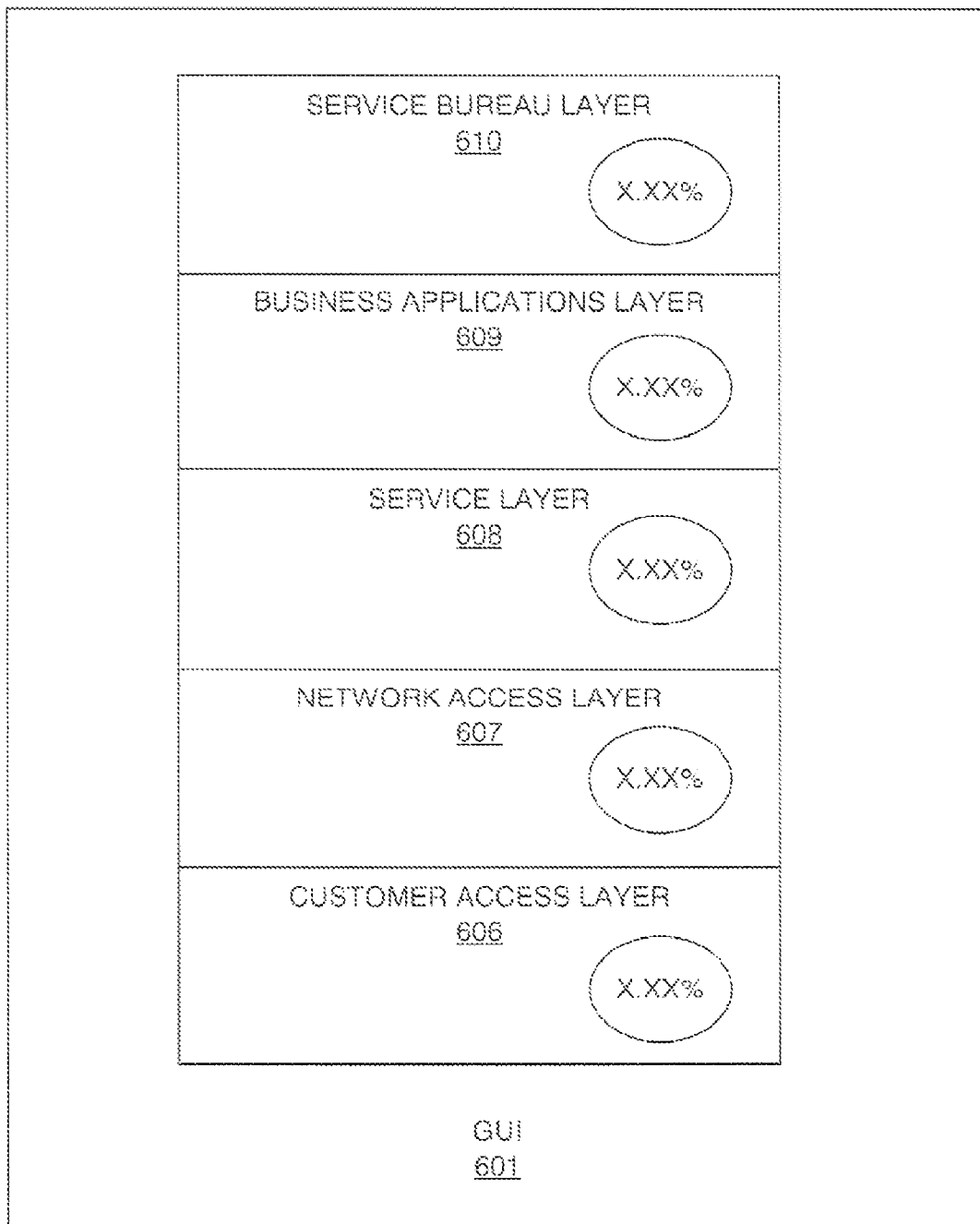
FIG. 7 illustrates a graphical user interface in an embodiment of the invention.

FIG. 7 illustrates GUI 601 after a user has selected on of either service A 603 or service B 602. As illustrated in FIG. 7, upon selecting a service, SAS 131 determines the availability of each service layer involved with the service as defined by a service layer model. In this example, the service layers are graphically represented by a customer access layer 606, a network access layer 607, a service layer 608, business applications layer 609, and a service bureau layer 610. Included in each graphical representation of the service layers are the resulting availability levels of each service layers. The availability levels are represented in FIG. 7 by a percentage metric generically stated as X.XX %. In an example, a service layer could have 99.999% availability, 99.99% availability, 99.9% availability, or the like.

Those skilled in the art will appreciate variations from these embodiments that fall within the scope of the invention. Those skilled in the art will appreciate that the features described above could be combined in various ways to form multiple embodiments of the invention. As a result, the invention is not limited to the specific embodiments described above, but only by the claims and their equivalents.

The invention claimed is:

1. A method of operating a service availability system to monitor the availability of a plurality of communication services with each having a plurality of service layers provided by a plurality of service elements, the method comprising:
in the service availability system:
receiving performance data from each of the service elements indicating the performance of each of the service elements;
processing the performance data to determine availability levels of each of the service layers for each of the plurality of communication services;
displaying the plurality of communication services on a graphical user interface;
receiving a user selection indicating a service of the plurality of communication services to be displayed; and
displaying the availability levels of each of the service layers for the selected service.

2. The method of claim 1 wherein a first service layer of the plurality of service layers comprises a customer access layer.

3. The method of claim 2 wherein a second service layer of the plurality of service layers comprises a network access layer.

4. The method of claim 3 wherein a third service layer of the plurality of service layers comprises a service access layer.

5. The method of claim 4 wherein a fourth service layer of the plurality of service layers comprises a business applications layer.

6. The method of claim 5 wherein a fifth service layer of the plurality of service layers comprises a service bureau layer.

7. A software product for operating a service availability system to monitor the availability of a plurality of communication services with each having a plurality of service layers provided by a plurality of service elements, the software product comprising:
a non-transitory media having stored thereon instructions that, when executed by a processing system, direct the processing system to:
receive performance data from each of the service elements indicating the performance of each of the service elements;
process the performance data to determine availability levels of each of the service layers for each of the plurality of communication services;
display the plurality of communication services on a graphical user interface;
receive a user selection indicating a service of the plurality of communication services to be displayed; and
display the availability levels of each of the service layers for the selected service.

8. The software product of claim 7 wherein a first service layer of the plurality of service layers comprises a customer access layer.

9. The software product of claim 8 wherein a second service layer of the plurality of service layers comprises a network access layer.

10. The software product of claim 9 wherein a third service layer of the plurality of service layers comprises a service access layer.

11. The software product of claim 10 wherein a fourth service layer of the plurality of service layers comprises a business applications layer.

12. The software product of claim 11 wherein a fifth service layer of the plurality of service layers comprises a service bureau layer.

* * * * *